United States Patent [19]

Maeda et al.

[11] Patent Number: 4,557,859
[45] Date of Patent: Dec. 10, 1985

[54] VULCANIZED OLEFIN-BASED RUBBER COMPOSITION

[75] Inventors: Masahiko Maeda, Tokyo; Naotochi Watanabe; Kenji Fujitani, both of Kanagawa, all of Japan

[73] Assignee: Showa Denko Kabushiki Kaisha, Tokyo, Japan

[21] Appl. No.: 514,899

[22] Filed: Jul. 18, 1983

[30] Foreign Application Priority Data

Jul. 16, 1982 [JP] Japan .................. 57-122971
Jul. 16, 1982 [JP] Japan .................. 57-122972

[51] Int. Cl.$^4$ .............................................. H01B 1/06
[52] U.S. Cl. .................... 252/511; 252/503; 524/437; 524/441; 524/495; 524/496; 525/331.8; 525/333.5; 525/333.9; 523/137
[58] Field of Search ............... 252/511, 503; 524/437, 524/441, 495, 496; 523/137; 525/331.8, 333.9, 333.5

[56] References Cited

U.S. PATENT DOCUMENTS 3,205,285  9/1965  Turbak et al. ............... 525/333.5
3,770,706 11/1973  Walles ......................... 525/333.5
4,321,162  3/1982  Guffens et al. ............... 524/495
4,404,125  9/1983  Abolins et al. ............... 524/496
4,508,640  4/1985  Kanda et al. ................. 252/511

OTHER PUBLICATIONS

Cond. Composites for EMI Shielding, Battelle Columbus Lab., 6–78.

Primary Examiner—Prince E. Willis
Assistant Examiner—Hoa Van Le
Attorney, Agent, or Firm—Sughrue, Mion, Zinn, Macpeak & Seas

[57] ABSTRACT

A vulcanized olefin-based rubber composition is disclosed which is produced by vulcanizing an olefin-based rubber composition with a sulfur-containing substance alone or with a sulfur-containing substance and a vulcanization accelerator in combination. The olefin-based rubber composition is composed of (A) olefin-based rubber composed mainly of ethylene and propylene and (B) aluminum or an aluminum alloy in the form of powder, fiber, or flake, or being composed of (A) olefin-based rubber composed mainly of ethylene and propylene, (B) aluminum or an aluminum alloy in the form of powder, fiber, or flake, and (C) electrically-conductive carbon black, and said sulfur-containing substance being selected from the group consisting of a sulfur-based vulcanizing agent and a sulfur-releasing agent.

The composition of this invention is superior in the shielding of electromagnetic waves.

17 Claims, 2 Drawing Figures

VULCANIZED OLEFIN-BASED RUBBER COMPOSITION

FIELD OF THE INVENTION

The present invention relates to a vulcanized olefin-based rubber composition. More particularly, it relates to a vulcanized olefin-based rubber composition having a superior property in shielding of electromagnetic waves.

BACKGROUND OF THE INVENTION

Radiation sources for electromagnetic waves have been increasing in number with continued advances in industrial technology and the general standard of living. The leakage of electromagnetic waves, therefore, has become a significant social problem since the wave can exert adverse influences on the human body. Such leakage may also cause the incorrect behavior of integrated circuits in electronic equipment. In particular, electromagnetic waves radiated from electronic computers and various office equipment exert advarse influences on television sets and audio equipment.

Even in the car industry, electronic devices are now used. For example, they are used in automatic controllers for various machines such as an engine, and further, in a speedmeter, a tachometer, and so forth. Several types of cars are now equipped with a microcomputer. In addition, electronic devices such as a telephone, a radio and a TV set are installed inside cars for the convenience of the driver. However, these electronic devices are liable to suffer from various operational difficulties under the influence of electromagnetic waves emanating from the engine compartment, or from a source outside the car.

The most serious problems in an automobile are troubles caused by transient phenomena that occur when the current fluctuates as machines in the car are operated, by induction at the route of load, by capacitive coupling, by inductive interference from a dynamo, by transient voltage due to radiation from the ignition system, and by electromagnetic waves emitted from the radio equipment. In particular, the wires connecting various parts in the engine compartment are under high voltage, and therefore they emit intensive electromagnetic waves which adversely affect the closely packed speed controllers, exhaust gas controller, engine controllers, etc. This makes it necessary to shield power lines, signal lines, control lines, and other lines in the engine compartment.

Electromagnetic waves are also radiated from electric wires and cables. They enter electronic machines and equipment directly or through an antenna, causing misoperation of IC's and LSI's which operate with extremely small currents. The conventional electric wires and cables are of such a structure that the insulation layer is covered with an electrically-conductive compound filled with carbon black so that power loss is minimized. The carbon blackfilled layer, however, does not prevent the radiation of electromagnetic waves.

Various methods have recently been used to shield such equipment against electromagnetic waves in British Pat. Nos. 1,073,567, 1,168,701, 1,195,076, 1,226,181 and 1,246,829 and U.S. Pat. Nos. 3,468,753, 3,491,056, 3,393,257, 3,474,067, 3,668,281, 3,673,121, 3,767,613, 4,006,114, 4,234,469 and 4,367,306.

In general, since metals can absorb or reflect electromagnetic waves, they are effectively used as shielding materials for electromagnetic waves radiated from an electronic oven and various communication apparatuses. In addition, plastics with metals deposited thereon by vacuum metallizing method or arc spray coating method can be used for the same purpose. Furthermore, materials prepared by adding additives, e.g., carbon powder and metal powder, to plastics can be used.

Using metals alone or other materials coated with metals are disadvantageous in that the specific gravity is large, moldability is poor, the procedure of treatment is not simple, and the treatment cost is high. Similarly, a method of introducing additives is disadvantageous in that when these additives are added in small amounts, the effect cannot be exhibited sufficiently. However, when they are added in large amounts, the mechanical strength and moldability of the resulting molded article are seriously reduced although the effect can be exhibited.

SUMMARY OF THE INVENTION

In order to overcome the above-mentioned disadvantages, the present inventors carried out a series of studies on a rubber composition which is superior in the shielding of electromagnetic waves. As the result, it was found that a vulcanized olefin-based rubber composition as specified below meets the requirements. (1) An olefin-based rubber composition composed of (A) 40 to 90 wt % of an olefin-based rubber composed mainly of ethylene and propylene and (B) 10 to 60 wt % of aluminum or an aluminum alloy in the form of powder, fiber, or flake (referred to as "aluminum component" hereinafter), or (2) an olefin-based rubber composition composed of (A) 40 to 90 wt % of an olefin-based rubber composed mainly of ethylene and propylene, (B) 5 to 55 wt % of aluminum component and (C) 5 to 55 wt % of electrically-conductive carbon black, wherein the total quantity of the aluminum component and electrically-conductive carbon black being 10 to 60 wt % in the composition, the composition being vulcanized with at least one sulfur-containing substance selected from the group consisting of a sulfur-based vulcanizing agent and a sulfur-releasing agent or with the sulfur-containing substance and a vulcanization accelerator in combination. Not only is the composition superior in the shielding of electromagnetic waves, but it also has many outstanding features. The present invention is based on these findings.

The composition of this invention is characterized by aluminum powder incorporated therein. Having a low specific gravity, aluminum powder can be uniformly mixed with olefin-based rubbers. Moreover, being flexible, aluminum powder is less likely to damage the mixer and mold and is mixed readily. Unlike iron, aluminum is not corroded by moisute in air.

The olefin-based rubber composition of this invention is superior in the shielding of electromagnetic waves and has the following outstanding features.
(1) Light in weight.
(2) Flexible, resilient, and moldable into any shape. Particularly, capable of covering wires in any shape.
(3) Good moldability. Capable of extrusion molding and compression molding into any desired shape.
(4) Applicable to the covering of movable parts, owing to flexibility and resilience.
(5) Superior in heat resistance (because the composition is vulcanized).

(6) The composition requires no secondary fabrication such as flame spraying, conductive coating, and plating. This leads to lower cost.

The composition of this invention will be found to have a wide variety of uses. Typical examples of such uses are given below.

(1) Covering of wires (for power lines, signal lines, and control lines) in computers, office machines (facsimile, printer, word processor, etc.), measuring instruments, and communications equipment
(2) Electrostatic noise filter for signal lines in electronic machines and equipment.
(3) Fitting packings placed between an electronic machine and a housing, and packing sheet for doors.
(4) Covering of power lines, signal lines, and control lines in an automobile.
(5Molded gaskets for waveguides and molded connectors for coaxial cables.
(6) Electrode roll for recording.
(7) Rubber switches for pocket calculators, telephones, and computers.

DETAILED DESCRIPTION OF THE INVENTION

(A) Olefin-based rubber

Figure 1:
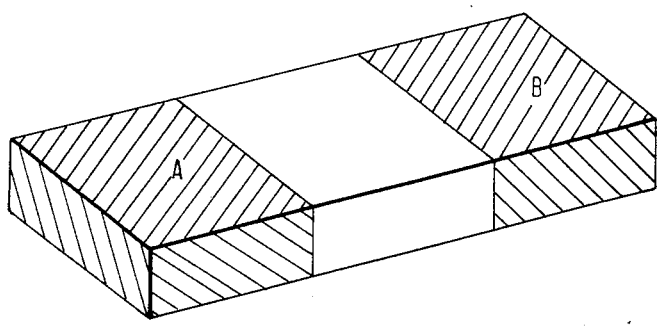
FIG. 1 is a perspective view of a test specimen used for measuring the volume resistivity. The sides indicated by A and B are coated with conductive silver paste.

The olefin-based rubber used in this invention is composed mainly of ethylene and propylene. In other words, it is a rubbery substance selected from the group consisting of EPR and EPDM. EPR is obtained by copolymerizing ethylene and propylene. EPDM is a multicomponent polymer rubber composed of ethylene and propylene and a small amount of other monomer having one or two double bonds. Examples of such monomer include linear or branched diolefins having two double bonds at the terminals such as 1,4-pentadiene, 1,5-hexadiene, and 3,3-dimenthyl-1,5-hexadiene; linear or branched diolefins having one double bond at the terminal such as 1,4-hexadiene and 6-methyl-1,5-heptadiene; and cyclic diene hydrocarbons such as bicyclo-[2,2,1]-heptene-2(norbornene) and a derivative thereof (e.g., ethylidene norbornene).

In EPR and EPDM, the weight ratio of ethylene monomer units to propylene monomer units is preferably from 20/80 to 80/20. In addition, the other monomer unit may be contained in EPDM in an amount of less than 10 wt %. These rubbery substances are industrially produced by using a catalyst composed mainly of a transition metal compound and an organometal compound (usually an organoaluminum compound). These rubbery substances preferably have a Mooney viscosity of 20 to 140, more preferably 30 to 120. M.I. of the rubber substances is generally from 0.1 to 6 g/10 min (as measured according to ASTM D-1238, at 190° C. under a load of 2.16 kg).

Methods of producing the olefin-based rubber and its properties are well known, as described in *Encyclopedia of Polymer Science and Technology*, vol. 5, p. 414 and vol. 6 pp. 359–384.

(B) Aluminum component

The mean size of the powdery aluminum or aluminum alloy is generally from 250 to 20 mesh. The diameter of the fibrous aluminum or aluminum alloy is generally from 0.0020 to 0.50 mm, and a fibrous aluminum or aluminum alloy having a length of 10 mm or less is preferred since it is easy to work with. Flaky aluminum or aluminum alloy may be in a form such as circular, triangular, square, rectangular, hexagonal or like from having a surface area of from 0.1 to 5 mm $\times$ 0.1 to 5 mm. A flaky aluminum or aluminum alloy preferably has a thickness of 0.1 mm or less, more preferably 0.02 to 0.1 mm. In particular, a flaky aluminum or aluminum alloy having a square form with a surface area of about 1 $\times$ 1 mm, and a thickness of about 0.03 mm has good dispersibility in the olefin-based rubber and does not become entangled unlike aluminum fibers, not forming any entangled material. Furthermore, these aluminum flakes have a strong tendency of orientating in the direction in which the olefin-based rubber flows during molding. When used in the same amount, therefore, the composition containing aluminum flakes not only has good electric conductivity, but also is improved with respect to flexural modulus of elasticity compared with the composition containing aluminum fibers. In particular, aluminum flakes having a surface area of 0.5 to 1.5 mm $\times$ 0.5 to 1.5 mm is most preferred from a viewpoint of dispersion properties.

The powdery, fibrous and flaky aluminum or aluminum alloys may be used alone. However, it is suitable to use them in combination with each other because the effect of the invention can be obtained at a low mixing ratio. The aluminum content of the aluminum alloy is usually at least 80% by weight.

(C) Carbon black

The electrically conductive carbon black as used herein generally has a specific surface area of from 20 to 1,800 m$^2$/g, as determined by the low temperature nitrogen absorption method (see ASTM D 3037-78) and the BET method, and a pore volume of from 1.5 to 4.0 ml/g as determined by the mercuryl pressure-introduction method (see *Powder Technology*, vol. 29 (1), pp. 45–52, 1981) within the pore diameter of from 30 to 7,500 Å. In particular, carbon black having a specific surface area of from 200 to 1,200 m$^2$/g can be effectively used in the invention.

The carbon black includes channel black, acetylene black, and carbon black produced by the furnace black method. Of these, carbon black produced by the furnace black method is particularly preferred because it has good dispersibility and does not reduce mechanical strength of the resulting composition. The method of production, physical properties, etc., of such carbon blacks are well known as described in Carbon Black Association et., *Handbook of Carbon Black*, Tosho Shuppan, Tokyo (1972), *Handbook of Rubber/Plastic Compounding Chemicals*, Rubber Digest Co., Ltd., Japan (1974), and *Encyclopedia of Polymer Science and Technology*, vol. 2, pp. 820–836.

The sulfur-containing substance used for vulcanization of the olefin-based rubber in this invention is a sulfurbased vulcanizing agent or a sulfur-releasing agent, which is commonly used in the rubber industry.

The sulfur-releasing agent is a compound which liberates sulfur at a comparatively high temperature (50 to 200° C.). Typical examples of the sulfur-releasing agent are those compounds which have a polysulfide bond. They are listed in *Handbook of Rubber and Plastics Chemicals* (issued in 1974 by Rubber Digest Co., Ltd.) pp. 19–57 and *Materials and Compounding Ingredients for Rubber and Plastics* (issued in 1965 by Publishers Printing Company) pp. 129–146. Examples of the sulfur-releasing agent include tetramethylthiuram disulfide, dipentamethylenethiuram disulfide, dipentamethylenethiuram tetrasulfide, and dipentamethylenethiuram hexasulfide. Of these, sulfur-releasing agents which liberate sulfur at 100 to 180° C. at which the olefin-based rubber is melted and processed are preferred.

The sulfur-based vulcanizing agent is descirbed in pages 1 to 5 of the above-mentioned *Handbook of Rubber and Plastics Chemicals*. The sulfur-based vulcanizing agent falls under two broad categories, sulfur and sulfur-containing compound. Sulfur includes sulfur powder, flower of sulfur, precipitated sulfur, and colloidal sulfur. Sulfur-containing compounds include sulfur monochloride, sulfur dichloride, morpholin disulfide, and alkylphenol disulfide.

The sulfur-releasing agent and sulfur-based vulcanizing agent used in the invention are also described in *Encyclopedia of Polymer Science and Technology*, vol. 12 p. 256 and vol. 14 p. 740.

Among these sulfur-containing substances, sulfur and sulfur-releasing agent are preferably used.

The vulcanization accelerator which can be used with the sulfur-containing substance is one which is commonly used in the rubber industry. It accelerates the vulcanization of the olefin-based rubber with a sulfur-containing substance. As the result of acceleration, the vulcanization time is reduced, the vulcanization temperature is lowered, and the requirement of sulfur-containing substance is decreased. Examples of the vulcanization accelerator are described in the above-mentioned *Materials and Compounding Ingredients for Rubber and Plastics*, pp. 45–91 and *Encyclopedia of Polymer Science and Technology*, vol. 14 p. 747 and vol. 12 p. 257.

Examples of the vulcanization accelerator used in this invention are classified into thiazole type, imidazoline type, dithiocarbamate type, thiourea type, thiuram type, sulfenamide type, xanthate type, guanidine type, and aldehyde-amine type.

The vulcanization accelerator used in this invention includes, for example, 2-mercaptobenzothiazole, dibenzothiazyl disulfide, zinc, sodium or copper salt of 2-mercaptobenzothiazole, cyclohexylamine salt of 2-mercaptobenzothiazole, 2-(2,4-dinitrophenyl)-mercaptobenzothiazole, N-diethyl-2-benzothiazyl sulfenamide, N-cyclohexyl-2-benzothiazyl sulfenamide, N,N-dicyclohexyl-2-benzothiazyl sulfenamide, N-oxydiethylene-2-benzothiazyl sulfenamide, 2-(2,6-dimethyl-4-morpholinothio)-benzothiazole, N,N-diisopropyl-2-benzothiazyl sulfenamide, N,N-diethylthiocarbamoyl-2-benzothizolyl sulfide, 2-mercaptoimidazoline-(ethylenethiourea), thiocarbanide, 1,3-bis(2-benzothiazole mercaptomethyl) urea, diethyl thiourea, trialkylthiourea, tetramethylthiuram monosulfide, tetramethylthiuram disulfide, tetrabutylthiuram disulfide, dipentamethylenethiuram monosulfide, sodium dimethyldithiocarbamate, zinc diethyldithiocarbamate, selenium dimethyldithiocarbamate, sodium pentamethylenedithiocarbamate, N-cyclohexyl-ethyl-ammonium-cyclohexylethyl-dithiocarbamate, piperidine-pentamethylene-dithiocarbamate, pipecoline-pipecolyl-dithiocarbamate, zinc isopropyl-xanthate, dibutyl-xanthogen-disulfide, diphenylguanidine, triphenylguanidine, diorthotolylguanidine salt of dicatechol boric acid, n-butylaldehyde-aniline condensate, butylaldehyde-monobutylamine condensate, $\alpha$-ethyl-$\beta$-propylacrolein-aniline condensate, hexamethylenetetramine, stearylamine, triethanolamine, triphenylphosphite, and tricresylphosphate.

When the olefin-based rubber composition comprised of the olefin-based rubber and the aluminum component is prepared, the proportion of the olefin-based rubber in the composition is from 40 to 90 wt %, preferably from 45 to 85 wt %, more preferably from 50 to 80 wt % and the proportion of the aluminum component is from 10 to 60 wt % preferably from 15 to 55 wt %, more preferably from 20 to 50 wt %. When the proportion of the aluminum component contained is less than 10 wt %, no sufficient electrical conductivity necessary for electromagnetic wave-shielding can be obtained. On the other hand, when the proportion of the aluminum component is more than 60 wt %, it becomes difficult to uniformly mix the aluminum component with the olefin-based rubber and even if an uniform composition is prepared, the resulting composition does not have sufficient strength for practice use.

When the olefin-based rubber composition which further contains the electrically conductive carbon black is prepared, the proportion of the olefin-based rubber contained in the composition is from 40 to 90 wt % and preferably from 50 to 85 wt %. The proportion of the aluminum component contained in the composition is from 5 to 55 wt % and preferably from 10 to 45 wt %. The proportion of the electrically conductive carbon black contained is from 5 to 55 wt % and preferably from 10 to 45 wt %. When the proportion of the electrically conductive carbon black is less than 5 wt %, no sufficient electrical conductivity necessary for electromagnetic waveshielding can be obtained. On the other hand, when the electrically conductive carbon black is added in greater amounts than 55 wt %, it becomes difficult to uniformly mix the carbon black with the olefin-based rubber, and the resulting composition does not have suffient strength for practical use.

Incorporation of the aluminum component into the olefin-based rubber composition is not only performed for the purpose of increasing the electromagnetic wave-shielding performance, but also is intended to achieve multiple scattering of electromagnetic waves on the surface of the aluminum component.

In order to enhance the synergistic effect of the electrically conductive carbon black and aluminum component, it is necessary to add the aluminum component in an proportion of at least 5 wt %. When the proportion of the aluminum component added is less than 5 wt %, the synergistic effect of the carbon black and aluminum component is decreased. On the other hand, when it is more than 55 wt %, it becomes impossible to uniformly mix the aluminum component with the olefin-based rubber.

One of the preferred features of the invention is that in the olefin-based rubber, the aluminum component is used in combination with the electrically conductive carbon black, and the total proportion of the aluminum component and the electrically conductive carbon black is from 10 to 60 wt %. Particularly it is preferred for the total proportion to be within the range of from 10 to 50 wt %. In connection with the volume ratio of aluminum component to electrically conductive carbon black, it is preferably within the range of from 4.0/1 to 1/4.0. It has been found that by mixing the electrically conductive carbon black having the electromagnetic wave-shielding effect at a high frequency region (MHz) and the aluminum component having the electromagnetic wave-shielding effect at a low frequency region (KHz), the resulting mixture is allowed to have the electromagnetic wave-shielding effect over a wider frequency region, and that even at a region where the electromagnetic wave-shielding effect is almost not exhibited when the aluminum component or electrically conductive carbon black is used alone, if they are used in combination with each other, the electromagnetic wave-shielding effect can be exhibited very significantly. Although the exact reason for such significant effect is not known, it is considered that electromagnetic wave energy reflected by or absorbed in the aluminum component is grounded through the electrically conductive carbon black. This is supported by the fact that when the aluminum component is used in combination with the electrically conductive carbon black, the electric conductivity of the composition of the invention is greatly increased.

When the total proportion of aluminum component and electrically conductive carbon black contained in the olefin-based rubber composition is less than 10 wt %, its electromagnetic wave-shielding effect is poor particularly at a low frequency region. On the other hand, when the proportion is more than 60 wt %, the moldability of the resulting composition is undersirably decreased.

The composition of this invention is vulcanized as mentioned later with a sulfur-containing substance or with a sulfur-containing substance and a vulcanization accelerator previously incorporated therein.

The sulfur-containing substance is generally used in an amount of 0.05 to 10 parts by weight, preferably 0.1 to 10 parts by weight, most preferably 0.2 to 8 parts by weight, based on 100 parts by weight of the olefin-based rubber and aluminum component (and carbon black). If the quantity is less than 0.05 parts by weight, the resulting composition is incomplete in vulcanization; and if it is over 10 parts by weight, the resulting composition becomes rigid due to excessive vulcanization.

The vulcanization accelerator may be added in an amount of 10 parts by weight or less, preferably 7 parts by weight or less, based on 100 parts by weight the olefin-based rubber and aluminum component (and carbon black). If the quantity is over 10 parts by weight, it would be difficult to control vulcanization due to an excessively high rate of vulcanization.

The composition can be prepared by dry-blending the components using a Henschel mixer and the like or by melt-mixing the components using a Banbury mixer, kneader, or roll mill, which are commonly used in the rubber industry. Uniform compositions are obtained by dry-blending the components first and melt-mixing the resulting mixture subsequently.

The composition of this invention may be incorporated with stabilizers against ozone and oxygen, metal deterioration-preventing agent, filler, plasticizer, softener and flame retarder which are generally used in the field of olefin-based rubbers, during the mixing process. For example, the stabilizers and flam retarder are described on pages 151 to 195, the plasticizer and softener on pages 233 to 362 and the filler on pages 424 to 477, in the above-mentioned *Materials and Compounding Ingredients for Rubber and Plastics*.

The melt-mixing in generally performed at room temperature to 100° C. Melt-mixing at a temperature above 100° C. will bring about vulcanization.

The sulfur-containing substance and vulcanization accelerator, which are used for the vulcanization of the composition of this invention, may be combined with a vulcanizing auxiliary (such as metal oxide, fatty acid, and derivatives thereof) and an antiscorch (such as phthalic anhydride and salicylic acid), which are commonly used in the rubber industry. Examples of vulcanizing auxiliary and antiscorch are given in pp. 58 to 68 and pp. 69 to 72, respectively, of the above-mentioned *Handbook of Rubber and Plastics Chemicals*.

In the preparation of the composition of this invention, three or more components may be mixed together all at once, or mixed one after another. In an example, olefin-based rubber, aluminum component, and electrically-conductive carbon black are mixed at first, and the mixture is then mixed with a sulfur-containing substance (and a vulcanization accelerator).

The vulcanized product, which is the final intended product of this invention, can be prepared by the vulcanization method which is generally used in the rubber industry. The composition is previously formed into a desired shape and then vulcanized.

Molding should be carried out in such a manner that vulcanization does not take place during molding. The molding method such as extrusion, calendering, compression molding, and injection molding, which are generally used in the rubber industry can be employed. The molding shape includes film, sheet, pipe, box, rod, and others.

The vulcanization is accomplished by steam vulcanization and heat vulcanization which are generally used in the rubber industry. The vulcanization temperature is 120 to 180° C., depending on the type and quantity of the sulfur-containing substance, vulcanization accelerator, vulcanizing auxiliary, and antiscorch (if used).

The vulcanized olefin-based rubber composition of the present invention has a low surface resistance ($10^6$ $\Omega$ or less). Where high surface resistance (more than $10^6$ $\Omega$) is required, for example, in the applications of the composition for insulated conductors such as signal line and control line, the composition of the present invention can be used with a surface layer of olefine-based rubbers composed mainly of ethylene and propylene formed thereon.

EXAMPLES AND COMPARATIVE EXAMPLES

The invention is now described in detail with reference to the examples that follow. However the scope of the invention is not limited to these examples.

In the Examples and Comparative Examples, the volume resistivity was measured using a specimen, 3 cm long and 1 cm wide, cut out of the molded product as shown in FIG. 1. Conductive silver paste was applied to parts A and B (1 cm wide) on both sides of the specimen. After the paste had dried completely, the resistance across A and B was measured using a tester (SANWA SR-3TR, made by Sanwa Denki Keiki Co., Ltd.). The volume resistivity ($\Omega$-cm) was obtained by dividing the thus measured resistance by the thickness (t) of the specimen.

The effect of shielding electromagnetic waves was measured as follows: The composition was formed into a 3-mm thick sheet and the sheet was formed into a box measuring $10 \times 10 \times 30$ cm. A portable oscillator adjusted to 200 MHz was placed in the box. This box was placed in a shielded room and the electromagnetic waves transmitted from the oscillator were received by an antenna and measured by a wattmeter. The same measurement was carried out without the box. The ratio of the electric field strength μV) measured in the presence and absence of the box was expressed in terms of decibel (dB) to indicate the electromagnetic attenuation amount of the sample sheet.

The hardness was measured using a JIS hardness meter (Shore A) placed on three dumbbell specimens (JIS K-6301, No. 3) piled one over another.

The flexural test was performed by winding a tubular specimen (1 mm thick, 15 mm in inside diameter, and 100 mm long) round a cylinder (10 mm in diameter). The cracks on the tube were observed with the naked eye and evaluated in the following three ranks.

| Rank | Degree of Cracking |
|---|---|
| A | No cracking |
| B | Slight cracking |
| C | Severe cracking |

The vulcanized products in the Examples and Comparative Examples were produced from the following components.

(A) Olefin-based rubber

Ethylene/propylene/non-conjugated diene terpolymer having a Mooney viscosity of 45 [$ML_{1+4}$ (100° C.)]. (The non-conjugated diene component: ethylidenenorbornene; iodine value: 25) This component is referred to as "EPDM" hereinafter.

(B) Aluminum flake

The size of flake is 1 mm by 1 mm and 0.03 mm thick. This component is referred to as "Al flake" hereinafter.

(C) Aluminum powder

The size of powder particle is 74 to 150 μm in diameter. This component is referred to as "Al powder" hereinafter.

(D) Aluminum fiber

The size of aluminum fiber is about 6 mm long and 65 μm in diameter. The component is referred to as "Al fiber" hereinafter.

(E) Electrically-conductive carbon black

Furnace black ("Vulcan XC-72", a product of Cabot Corp., U.S.A.) having an average particle diameter of 30 mμ, a density of about 1.8 g/cc, and a surface area of 220 m²/g. This component is referred to as "CB-1" hereinafter.

Ketjen black (a product Akzo, Holland) having a density of 1.8 g/cc and a surface area of 1195 m²/g. This component is referred to as "CB-2" hereinafter.

(F) Vulcanizing agent

Sulfur powder (200 mesh pass; specific gravity 2.26; melting point 115° C.; boiling point 444° C.). This component is referred to as "S" hereinafter.

(G) Vulcanization accelerator

2-Mercaptobenzothiazole (acidic accelerator) (light yellowish powder; specific gravity 1.50; melting point 170° C.) This component is referred to as "M" hereinafter.

N,N-dicyclohexyl-2-benzothiazylsulfenamide (delayed action accelerator) (grayish white powder; specific gravity 1.20; melting point 95° C.) This component is referred to as "DZ" hereinafter. Tetramethylthiurammonosulfide (ultrarapid accelerator) (yellowish powder, specific gravity 1.38; melting point 110° C.) This component is referred to as "TS" hereinafter.

(H) Vulcanizing auxiliary

Zinc oxide (white powder, specific gravity 5.50; average particle size 0.5 μm, melting point 1800° C.) This component is referred to as "ZnO" hereinafter. Stearic acid (white powder, specific gravity 0.95; melting point 72° C., boiling point 360° C.) This component is referred to as "St" hereinafter.

(I) Plasticizer

Tri-(2-ehtylhexyl)-trimellitate (liquid, molecular weight 547; specific gravity 0.990; freezing point −30° C.) This component is referred to as "TOTM" hereinafter.

EXAMPLES 1 to 7 and COMPARATIVE EXAMPLES 1 to 3

The above-mentioned components were mixed at the ratios shown in Table 1, using an open roll set to a surface temperature of 50° C., for 20 minutes. The resulting mixture was formed into a sheet. The sheet was then vulcanized by pressing at 180° C. and 100 kg/cm² for 10 minutes.

The volume resistivity, attenuation amount, and hardness of the sheet were measured. The results are shown in Table 2.

The sheet prepared by roll mixing was formed into a tube, 1 mm thick and 10 mm in outside diameter, using a rubber extruder (40 mm in diameter). The tube was subjected to steam vulcanization (steam pressure 6 kg/cm², at 160° C., for 20 minutes) using a cylindrical vulcanizer (30 mm in inside diameter and 65 cm long). The vulcanized tube was subjected to flexural test. The results are also shown in Table 2.

TABLE 1

| Example No. | Formulation (parts by weight) | | | | | | | | Aluminum | |
|---|---|---|---|---|---|---|---|---|---|---|
| | EPDM | S | M | DZ | TS | ZnO | St | TOTM | Type | Ratio* |
| Example 1 | 70 | 1.5 | 0.5 | 0.5 | 1.5 | 5 | 1 | 12 | Al powder | 30 |
| Example 2 | 70 | 1.5 | 0.5 | 0.5 | 1.5 | 5 | 1 | 12 | Al fiber | 30 |
| Example 3 | 70 | 1.5 | 0.5 | 0.5 | 1.5 | 5 | 1 | 12 | Al flake | 30 |
| Example 4 | 80 | 2.5 | 1.0 | 1.0 | 2.5 | 7 | 2 | 15 | Al flake | 20 |
| Example 5 | 90 | 2.5 | 1.0 | 1.0 | 2.5 | 7 | 2 | 15 | Al flake | 10 |
| Example 6 | 60 | 1.5 | 0.5 | 0.5 | 1.5 | 5 | 1 | 12 | Al powder | 40 |
| Example 7 | 50 | 1.5 | 0.5 | 0.5 | 1.5 | 5 | 1 | 12 | Al powder | 50 |
| Comparative Example 1 | 100 | 2.5 | 1.0 | 1.0 | 2.5 | 7 | 2 | 15 | — | 0 |
| Comparative Example 2 | 97 | 2.5 | 1.0 | 1.0 | 2.5 | 7 | 2 | 15 | Al powder | 3 |
| Comparative Example 3 | 20 | 0.3 | 0.2 | 0.2 | 0.3 | 2 | 0.3 | 4 | Al powder | 80 |

*parts by weight

TABLE 2

| Example No. | Volume resistivity (Ω-cm) | Attenuation Amount (dB) | Hardness | Flexural test |
|---|---|---|---|---|
| Example 1 | $10^0$ | 21 | 62 | A |
| Example 2 | $10^0$ | 18 | 65 | A |
| Example 3 | $10^0$ | 24 | 61 | A |
| Example 4 | $10^1$ | 17 | 60 | A |
| Example 5 | $10^2$ | 15 | 60 | A |
| Example 6 | $10^0$ | 25 | 68 | A |
| Example 7 | $10^0$ | 28 | 68 | A |
| Comparative Example 1 | $10^{14}$ | 0 | 56 | A |
| Comparative Example 2 | $10^{14}$ | 0 | 58 | B |
| Comparative Example 3 | $10^0$ | 55 | 68 | C |

EXAMPLES 8 to 14 and COMPARATIVE EXAMPLES 4 to 9

Vulcanized sheets and tubes were prepared and tested in the same manner as in the above-mentioned examples, using the following formulations.
S : 1.5 parts by weight
M : 0.5 parts by weight
DZ : 0.5 parts by weight
TS : 1.5 parts by weight
ZnO : 5 parts by weight
St : 1 part by weight
TOTM : 12 parts by weight
EPDM : as shown in Table 3
Aluminum : as shown in Table 3
Carbon black : as shown in Table 3
In Comparative Examples 4 to 6, S, M, DZ, TS, ZnO, and St were not incorporated.
The results are shown in Table 4.

TABLE 3

| Example No. | Formulation | | | Aluminum | |
|---|---|---|---|---|---|
| | EPDM | CB-1 | CB-2 | Type | Ratio |
| Example 8 | 50 | 15 | 15 | Al powder | 20 |
| Example 9 | 50 | 15 | 15 | Al fiber | 20 |
| Example 10 | 50 | 15 | 15 | Al flake | 20 |
| Example 11 | 50 | 30 | 0 | Al flake | 20 |
| Example 12 | 50 | 0 | 20 | Al flake | 20 |
| Example 13 | 50 | 15 | 10 | Al powder | 30 |
| Example 14 | 50 | 10 | 10 | Al powder | 40 |
| Comparative Example 4 | 50 | 15 | 15 | Al powder | 20 |
| Comparative Example 5 | 50 | 15 | 15 | Al fiber | 20 |
| Comparative Example 6 | 50 | 15 | 15 | Al flake | 20 |
| Comparative Example 7 | 97 | 0 | 0 | Al flake | 3 |
| Comparative Example 8 | 97 | 3 | 0 | Al flake | 0 |
| Comparative Example 9 | 20 | 15 | 15 | Al flake | 50 |

TABLE 4

| Example No. | Volume resistivity (Ω-cm) | Attenuation Amount (dB) | Hardness | Flexural test |
|---|---|---|---|---|
| Example 8 | $10^0$ | 38 | 66 | A |
| Example 9 | $10^0$ | 36 | 67 | A |
| Example 10 | $10^0$ | 39 | 70 | A |
| Example 11 | $10^0$ | 32 | 73 | A |
| Example 12 | $10^0$ | 35 | 72 | A |
| Example 13 | $10^0$ | 41 | 75 | A |
| Example 14 | $10^0$ | 45 | 72 | A |
| Comparative Example 4 | $10^0$ | 37 | 70 | C |
| Comparative Example 5 | $10^0$ | 37 | 72 | C |
| Comparative Example 6 | $10^0$ | 38 | 70 | C |
| Comparative Example 7 | $10^{14}$ | 0 | 56 | A |
| Comparative Example 8 | $10^{14}$ | 0 | 57 | A |
| Comparative Example 9 | $10^0$ | 50 | 78 | C |

Figure 2:
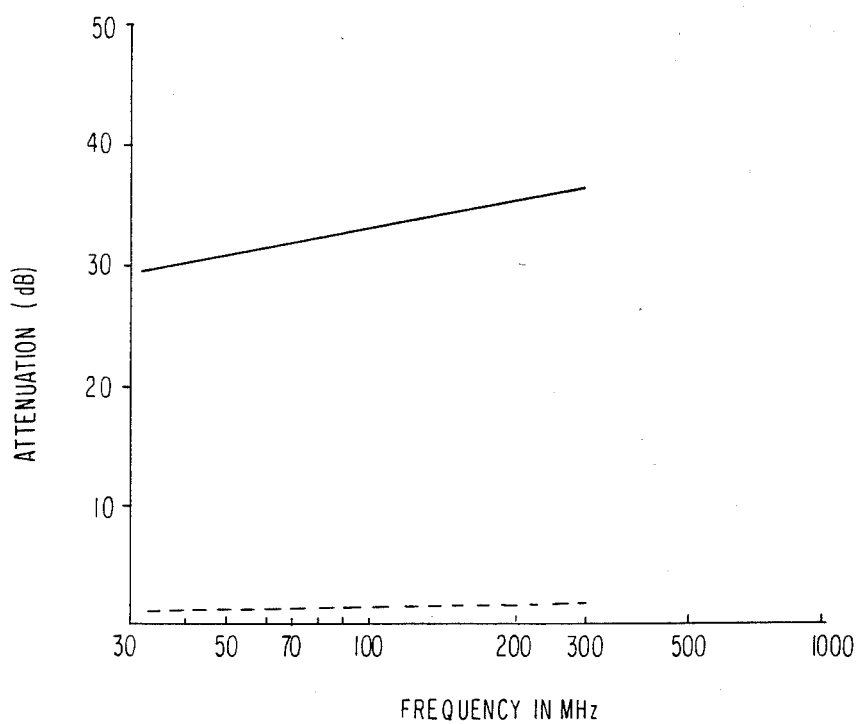
FIG. 2 is a graph showing the electromagnetic attenuation property of the vulcanized olefin-based rubber composition of the present invention.

Further, electromagnetic attenuation amounts (dB) of the vulcanized tubes obtained in Example 11 and Comparative Example 8 were measured by the absorbing clamp method according to *International Special Committee on Radio Interference (CISPR)*, Pub. 16-1977 [4], paragraph 11. The results are shown in FIG. 2 wherein the solid line and the dot line are those of the vulcanized tubes obtained in Example 11 and Comparative Example 8, respectively.

The above-mentioned Examples and Comparative Examples indicate that the composition of this invention is superior not only in flexibility and resiliency but also in the shielding of electromagnetic waves (particularly of high frequency), and that it can be used as the shielding material for electronic machines and equipment and signal lines and other lines.

While the invention has been described in detail and with reference to specific embodiment thereof, it will be apparent to one skilled in the art that various changes and modifications can be made therein without departing from the spirit and scope thereof.

What is claimed is:

1. An olefin-based rubber composition, comprising:
   (A) 40 to 90 wt % of an olefin-based rubber consisting essentially of ethylene and propylene; and
   (B) 5 to 55 wt % of a metal selected from the group consisting of aluminum and an aluminum alloy in a form selected from the group consisting of powder, fiber, and flake; and
   (C) 5 to 55 wt % of electrically-conductive carbon black, the total quantity of the aluminum powder and the electrically-conductive carbon black being 10 to 60 wt % in the composition, said composition being vulcanized with a sulfur-containing substance.

2. An olefin-based rubber composition as claimed in claim 1, wherein the sulfur-containing substance is selected from the group consisting of a sulfur-based vulcanizing agent and a sulfur-releasing agent.

3. An olefin-based rubber composition as claimed in claim 1, wherein the composition is vulcanized with the sulfur-containing substance combined with a vulcanization accelerator.

4. An olefin-based rubber composition as claimed in claim 1, wherein the metal is present in the form of flakes having an area of 0.1 to 0.5 mm × 0.1 to 5 mm and a thickness of about 0.02 to 0.1 mm.

5. An olefin-based rubber composition as claimed in claim 1, wherein the aluminum alloy contains 80 wt % aluminum or more.

6. An olefin-based rubber composition as claimed in claim 1, wherein the electrically-conductive carbon black has a specific surface area in the range of 20 to 1,800 m²/g, and a pore volume of 1.5 to 4.0 ml/g, the pores ranging in size from 30 to 7,500 Å in diameter.

7. An olefin-based rubber composition as claimed in claim 6, wherein the carbon black has a specific surface area in the range of 200 to 1,200 m²/g.

8. An olefin-based rubber composition as claimed in claim 1, wherein the metal and the electrically conductive carbon black are present in a combined amount in the range of 10 to 50 wt %.

9. An olefin-based rubber composition as claimed in claim 8, wherein the volume ratio of the metal to the electrically-conductive carbon black is in the range of 4.0/1 to 1/4.0.

10. An olefin-based rubber composition as claimed in claim 1, wherein the sulfur-containing substance is present in an amount in the range of 0.05 to 10 parts by weight per 100 parts by weight of the olefin-based rubber, the metal and the carbon black.

11. An olefin-based rubber composition as claimed in claim 10, wherein the sulfur-containing substance is present in an amount in the range of 0.2 to 8 parts by weight per 100 parts by weight of the olefin-based rubber, the metal and the carbon black.

12. An olefin-based rubber composition as claimed in claim 3, wherein the vulcanization accelerator is present in an amount of 10 parts by weight or less per 100 parts by weight of the olefin-based rubber, the metal and the carbon black.

13. An olefin-based rubber composition as claimed in claim 1, wherein the weight ratio of ethylene to propylene in the olefin-based rubber is from 20/80 to 80/20.

14. An olefin-based rubber composition as claimed in claim 1, wherein the olefin-based rubber further contains as an additional monomer unit a monomer selected from the group consisting of linear or branched diolefins having two double bonds at the terminals thereof, linear or branched diolefins having one double bond at a terminal thereof and cyclic diene hydrocarbons, in an amount of less than 10 wt % of the olefin-based rubber.

15. An olefin-based rubber composition as claimed in claim 14, wherein the additional monomer unit is a monomer selected from the group consisting of 1,4-pentadiene, 1,5-hexadiene, 3,3-dimethyl-1,5-hexadiene, 1,4-hexadiene, 6-methyl-1,5-heptadiene, norborene and ethylidene norbornene.

16. An olefin-based rubber composition as claimed in claim 1, wherein the olefin-based rubber has a Mooney viscosity of 20 to 140 and a melt index of 0.1 to 6 g/min when measured at 190° C. under a load of 2.16 kg.

17. An olefin-based rubber composition as claimed in claim 1, wherein said composition consists essentially of said olefin-based rubber, said metal and said carbon black, vulcanized with said sulfur-containing substance.

* * * * *